US008185421B2

(12) United States Patent  
Fertig et al.

(10) Patent No.: US 8,185,421 B2
(45) Date of Patent: May 22, 2012

(54) MULTI-OBJECTIVE OPTIMIZATION WITHIN A CONSTRAINT MANAGEMENT SYSTEM

(75) Inventors: Kenneth W. Fertig, Palo Alto, CA (US); Sudhakar Y Reddy, Santa Clara, CA (US); Philip L. Stubblefield, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1423 days.

(21) Appl. No.: 11/382,284

(22) Filed: May 9, 2006

(65) Prior Publication Data

US 2007/0239497 A1 Oct. 11, 2007

Related U.S. Application Data

(60) Provisional application No. 60/743,898, filed on Mar. 29, 2006.

(51) Int. Cl.
*G06Q 10/00* (2012.01)
(52) U.S. Cl. .................................. 705/7.11; 706/19
(58) Field of Classification Search ............... 705/7.11; 706/19
See application file for complete search history.

(56) References Cited

U.S. PATENT DOCUMENTS

| | | | | |
|---|---|---|---|---|
| 6,757,667 | B1* | 6/2004 | Patel .......................... | 706/19 |
| 7,363,280 | B2* | 4/2008 | Jin et al. ...................... | 706/13 |
| 2005/0246148 | A1* | 11/2005 | Levitan et al. ................ | 703/2 |
| 2006/0015829 | A1* | 1/2006 | De Smedt et al. ............. | 716/2 |
| 2006/0271210 | A1* | 11/2006 | Subbu et al. .................. | 700/44 |

OTHER PUBLICATIONS

Constraint Management Methodology for Conceptual Design Tradeoff Studies, Reddy et al., Proceedings of the 1996 ASME Design Engineering Technical Conference and Computers in Engineering Conference Aug. 18-22, 1996, Irvine, California, 96-DETC/DTM-1228 (referred to as "Reddy" in the office action).*
Reddy et al., Constraint Management Methodology for Conceptual Design Tradeoff Studies, Reddy et al., Aug. 1996, 11 pgs.*
Multi-Objective Optimization Model using Constraint-Based Genetic Algorithms for Thailand Pavement Management, Pannapa et al., Journal of the Eastern Asia Society for Transportation Studies, vol. 6, pp. 1137-1152, 2005.*
R. Fabregat, Yezid Donoso, B. Baran, F. Solano, and J. L. Marzo. Multi-objective optimization scheme for multicast flows: a survey, A model and a MOEA solution. In Proceedings of the 3rd International IFIP/ACM Latin American Conference on Networking, pp. 73-86, New York, NY, USA, 2005, ACM.*

* cited by examiner

*Primary Examiner* — Romain Jeanty
*Assistant Examiner* — Timothy Padot
(74) *Attorney, Agent, or Firm* — Caven & Aghevli LLC

(57) ABSTRACT

Multi-Objective Optimization (MOO) is integrated with a Constraint Management System (CMS) so as to rapidly and flexibly search large design spaces and focus on "interesting" designs as determined by user-specified criteria. A method embeds a trade space and its trade-off envelope within the same CMS network used to calculate the values of the points in the trade space itself. The method supports automatic variation of the resulting trade-off analyses in response to variations in upstream parameters, assumptions, and/or requirements. When feasible, the CMS can back-solve for values of upstream parameters so that selected attributes of the trade-off envelope achieve user-specified values. The coupled use of a CMS with multi-objective optimization avoids having to generate a large set of permutations of inputs and factors and then restricting the analysis to those having desired outputs or of having to manually "reformulate" the equation set so that it solves in the desired direction.

8 Claims, 5 Drawing Sheets

1. Set NewNdPoints to the result of pushing the symbol ":head" onto front of Copy(OldNdPoints).
2. Loop1: For each c in C:
    I. Set ndRemoved = False. Set beginLoop2 = True.
    II. Loop2:
        1. If beginLoop2 = True,
            A. Do:
                i. Set NdPointsCdr = Rest(NewNdPoints),
                ii. Set NewNdPointsCdr = NewNdPoints, and
                iii. Set beginLoop2 = False
            B. Else, do
                i. Set NdPointsCdr = Rest(NdPointsCdr), and
                ii. If ndRemoved is True
                    1. Do:
                        a. Set NewNdPoints = NewNdPointsCdr
                    2. Else, do:
                        a. Set NewNdPoints = Rest(NewNdPointsCdr)
        2. If NdPointsCdr is empty, do:
            A. Set NewNdPoints = result of pushing c onto end of NewNdPoints, and
            B. Exit Loop2
        3. Set ndpoint = First(NdPointsCdr)
        4. Set ndRemoved = False
        5. If c = ndpoint, exit Loop2,
        6. If c dominates ndpoint,
            A. Do:
                i. Remove ndpoint from NewNdPoints by setting Rest(NewNdPoints) = Rest(Rest(NewNdPointsCdr)).
                ii. Set NdRemoved = True
            B. Else, if ndpoint dominates candidate c, exit Loop2
        7. Continue Loop2 by going to II-1.
    III. Continue Loop1 by going to 2-I.
3. Return NewNdPoints as the non-dominated set.

FIG. 1

1. Initialize Loop variables:
    i. Set S = ϕ
    ii. Set NdPoints =ϕ,
    iii. Set j =1
    iv. Compute initial set of candidates, C_init = {c[1], c[2],..., c[N]} where N is a user-specified sample size (e.g. 200) using user-specified sampling according to trade space generator specifications provided in the problem definition.
2. Loop:
    i. If j=1, set C = C_init, else set C = NeighborSample(S, NdPoints, j, N), described subsequently.
    ii. Set S = Union(S, C)
    iii. Set NdPoints = ParetoFilter(S, NdPoints)
    iv. j = j+ 1
    v. If j> Niter,
        1. Compute NdεPoints from S given NdPoints.
        2. Exit Loop returning S, NdPoints and NdεPoints,
    vi. Else continue Loop by going to 2-i.

FIG. 2

MULTI-OBJECTIVE OPTIMIZATION WITHIN A CONSTRAINT MANAGEMENT SYSTEM

CROSS-REFERENCE TO RELATED APPLICATIONS

The present application claims priority from U.S. Provisional Patent Application No. 60/743,898, which was filed Mar. 29, 2006 and which is incorporated herein by reference in its entirety.

FIELD OF THE INVENTION

The present invention relates generally to parametric engineering modeling and, in particular, to methods of efficiently exploring large trade spaces by coupling constraint management systems with multi-objective optimization algorithms.

BACKGROUND INFORMATION

A typical parametric engineering model might contain thousands of variables and constraints (or "equality relations"). When combined with the sets of feasible variable values, the resulting combinatorial explosion can result in an enormous trade space, in some cases involving thousands to billions of alternative configurations. Exhaustive search of such trade spaces is often infeasible. Even when possible, manually sifting through so many cases is often impractical. Furthermore, even automated systems require guidance to determine where to focus the search for good designs. In the absence of a domain expert or experienced user, the need exists for some means to narrow the trade space in accordance with user input constraints so as to focus the analysis on the areas of interest.

Constraint management systems (CMS) can provide such focus when combined with automatic robust non-linear algebraic equation solvers. Such hybrid systems merge the concepts of "input parameters" and "output parameters" into a single parameter set from which the user is free to choose which parameters will be treated as inputs for any given trade study, leaving the rest to be computed by the constraint network. This choice can be made at runtime (subject to mathematical feasibility), allowing the user to perform trades in which certain parameters normally thought of as "outputs" are varied over user-specified values.

Conventional approaches to such large optimization problems include performing a brute force search through the trade space, a task that is time consuming and impractical in many cases. While various multi-objective optimization algorithms have been employed in an attempt to overcome the combinatorial explosion problem associated with large trade spaces, it is extremely difficult to force the outputs of such algorithms to satisfy auxiliary conditions. It can be impractical to restrict the set of analyses to satisfy large sets of complex equality constraints.

SUMMARY OF THE INVENTION

The present invention is directed to a method and system of integrating Multi-Objective Optimization (MOO) with a Constraint Management System (CMS) so as to rapidly and flexibly search large design spaces and focus on "interesting" designs as determined by user-specified criteria. An exemplary embodiment of the present invention combines a CMS, robust nonlinear equation solvers, and multi-objective optimization algorithms. The CMS and the nonlinear equation solvers allow a user to easily switch the normal role of input and output variables, subject to mathematical feasibility as determined by the CMS. Effectively, the system automatically back-solves for the values of user-selected input variables in order to meet user-specified values of user-selected output variables. The CMS decomposes the network of equality constraints into coupled subsets that are more easily and robustly managed by the nonlinear equation solvers. This methodology avoids the extremely laborious procedure of generating a very large set of permutations of inputs and factors and then restricting the analysis to those that have desired outputs or of requiring the user to manually "reformulate" the equation set so that it solves in the desired direction.

The CMS-based method of the present invention can be performed in seconds, in contrast to a conventional approach, which may take anywhere from days to weeks to complete. Further, when the results of such multi-objective optimizations are embedded within the same constraint network being used to model a system or system of systems, then the CMS can automatically re-optimize the subsystems in response to changes in system-level parameters, use scenarios, and other requirements, enabling the user to consider alternative system configurations whose subsystems have already been optimized.

In an exemplary embodiment of a method in accordance with the present invention, a computed trade space is represented in a single compound-valued variable that contains both user-specified independent variable values and user-specified output variable values. This compound-valued variable is itself a full member of the constraint network—as are the original input and output variables that define the trade space—and is therefore available to other constraints in the model.

Several embodiments of the present invention are possible. In an exemplary embodiment, the value of the compound-valued variable representing the multiple cases of the trade space is generated independently of the consideration of which variables are to be optimized. This is typically done in the early design stages when the problem is not fully formed. The number of cases within such a compound-valued variable can be tens of thousands or more. At this point, a Pareto filter can be used to focus on different trade-off envelopes associated with the trade space under consideration. The output of this filter is itself another compound-valued variable and is also a full member of the original CMS network. If the user changes the values of any "upstream" parameters, the CMS automatically updates the computed trade space and its associated Pareto envelopes.

In a further embodiment, a specific multi-objective optimization algorithm is employed in generating the cases within the trade space itself. A combination of a simulated annealing/evolutionary search algorithm is employed to bias the generation of cases within the computed trade space to be on or near the Pareto frontier of the trade space As above, this computed trade space, with biased sampling on the Pareto frontier is a compound-valued variable that is itself a full member of the constraint network and is therefore available to other constraints within the CMS.

Application of the methods and systems of the present invention can result in several orders of magnitude increase in the effective size of the trade space that can be explored in a given time frame using integrated system-level cost/performance models. It is particularly relevant to those cases where there are multiple measures of effectiveness as a function of a large number of parameters that define alternative subsystem designs. Current techniques require prohibitive amounts of time and effort to process the results of subsystem optimizations and combine them into integrated system studies. The present invention overcomes these issues. It allows for significantly more rapid identification of the "interesting" parts of the design space by automating in large part the construction of the trade-off envelope (or Pareto frontier) for that design space. The present invention also permits direct determination of input requirements to achieve specified characteristics of a trade-off envelope.

The present invention provides a capability that improves the trade analysis process by reducing the time to characterize and examine the trade space and allowing a more focused study on desired parts of the trade space.

The above and other aspects of the present invention are described in greater detail below.

BRIEF DESCRIPTION OF THE DRAWINGS

FIG. 1 shows a listing of an exemplary pseudo-code implementation of a Pareto filtering algorithm in accordance with the present invention.

FIG. 2 shows a listing of an exemplary pseudo-code implementation of a sampling procedure in accordance with the present invention.

DETAILED DESCRIPTION

Figure 3:
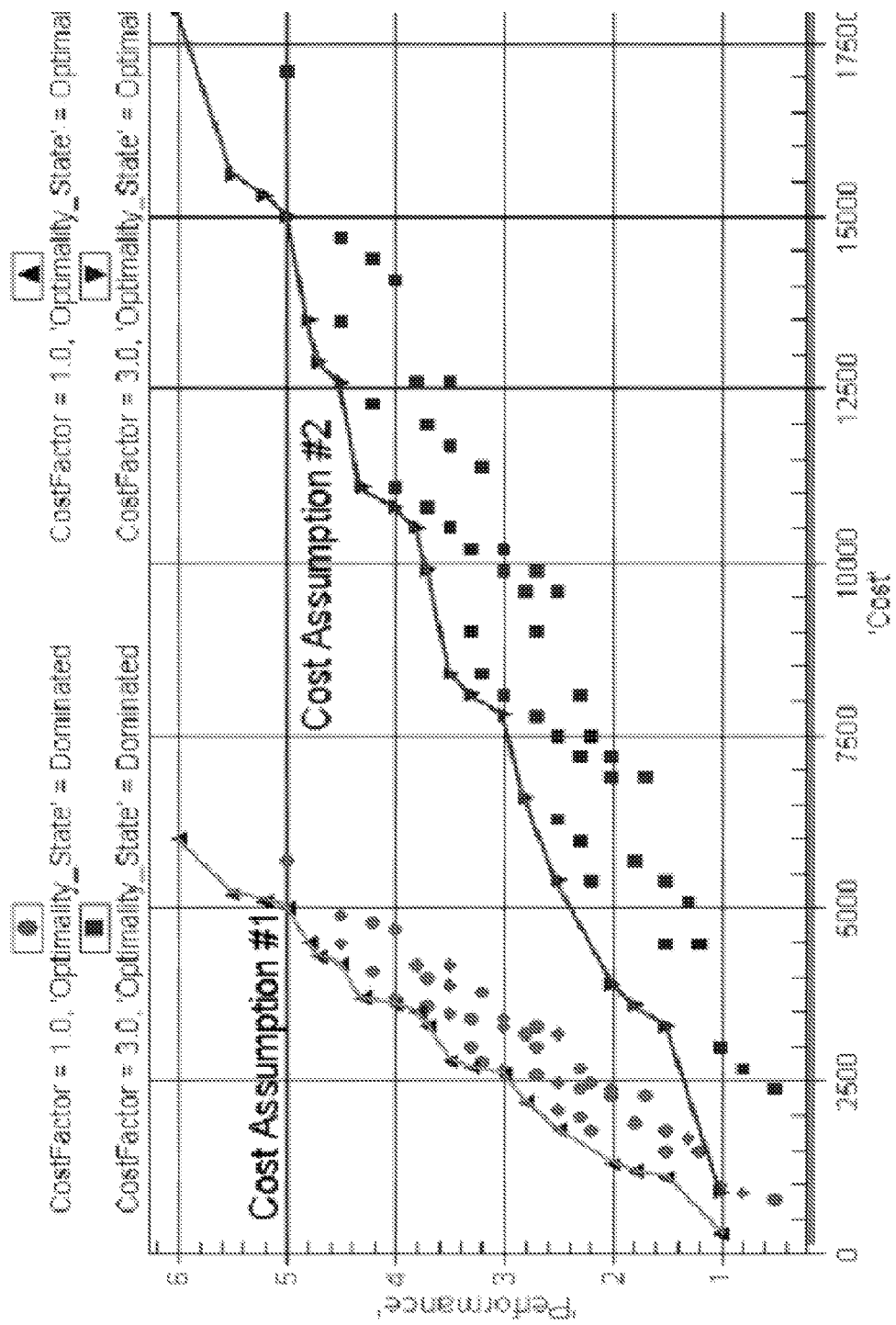
FIG. 3 is a chart illustrating the variation of the Pareto frontier for two different modeling assumptions for an exemplary optimization problem.

In an exemplary embodiment of the present invention, a trade space comprises: 1) a set of independent variables, $x_1, x_2, \ldots, x_n$; 2) a set of regions of interest for the independent variables, said regions being specified either as box-constraints, (e.g., $a_1 \leq x_1 \leq b_1$), or general deterministic or stochastic operations (e.g., $x_2$ is uniformly distributed between $x_1-a_2$ and $x_1+b_2$); 3) a set of objectives, $y_1, \ldots, y_m$; and 4) a set of equality constraints, $R\_j$, that form an implicit mapping from the set of independent variables (x-space) to the set of objectives (y-space). The constraints may be specified by the user. For example, during the conceptual design phases of a space launch system one is concerned with multiple performance metrics such as orbit altitude and inclination, payload to orbit, vehicle weight, re-usability, as well as detailed considerations of drag, lift, and stability. One is also concerned with multiple cost metrics, including development cost, first unit cost, life-cycle cost, maintenance cost, and so on. There are also operational considerations such as ground support requirements, turnaround considerations, and so on. In the design of such systems, one often considers several variables as independent, including, for example: the thrust-to-weight ratios of the different vehicle stages; the geometric parameters of the vehicle (e.g., fuselage length, diameter, characterization of any lifting body or melded wing, number of stages, etc.); orbit specifications; and detailed engine parameters (e.g., propellant choices, mixture ratios, etc.) In a study for a space operations vehicle, for example, the conceptual design problem involved 6000 variables and 4000 equality constraints.

Large samples within a trade space are computed, either with complete enumeration (factorial designs), or they are stochastically generated using probability operators. The results of this generation are stored in a compound-valued variable. In an exemplary embodiment of the present invention, this compound-valued variable is a sequence of hashtables, although it could be represented conveniently as any two-dimensional data structure. Each element in this sequence is a different point (x, y) in the trade space (i.e., it has a different set of input values for $x_1, \ldots, x_n$, and consequent output values for $y_1, \ldots y_m$.) Each of these elements is itself a mapping, represented as a hash table with variables $(x_1, \ldots, x_n, y_1, \ldots, y_m)$ as hash-keys and corresponding variable-values as hash-values.

An exemplary embodiment in accordance with the present invention comprises at least one of two sampling procedures. The first sampling procedure is uncoupled from the multi-objective optimization problem, resulting in a broad characterization of the entire trade space. The second sampling procedure is biased towards the Pareto frontier of the trade space using simulated annealing/evolutionary algorithms.

Both sampling procedures of the present invention employ a Pareto filtering algorithm that determines the Pareto frontier and near Pareto frontier associated with a given set of points. An exemplary Pareto filtering algorithm is described below.

Let $y_1, \ldots, y_m$ be real-valued objective variables whose values $y_1, \ldots, y_m$, are computed by a constraint management system (CMS), corresponding to the possibly implicit functions $f_1(x_1, \ldots, x_n, y_1, \ldots y_m)=0, \ldots, f_m(x_1, \ldots, x_n, y_1, \ldots y_m)=0$. Without loss of generality, we assume that each objective, $y_k$, is to be maximized.

Let $S=\{s[1], s[2], \ldots s[SN]\}$ be a sequence of points, where each $s[i]=(x_1[i], \ldots x_n[i], y_1[i], \ldots, y_m[i])$ is a "point" in the design space that satisfies the constraint network implied by the functions $f_1 \ldots f_m$, mentioned above. $s[i]$ is said to "dominate" $s[j]$ if $y_k[i] \geq y_k[j]$ for all k and $y_{k'}[i] > y_{k'}[j]$ for at least one $k'$ and $s[i]$ "$\epsilon$-dominates" $s[j]$ if $y_k[i] > y_k[j]+\epsilon$ for all k.

$s[i]$ is said to be "Pareto optimal" or "non-dominated", if it is not dominated by any point in S. The set of all non-dominated points in S is designated NdPoints. $s[i]$ is said to be near Pareto optimal or near non-dominated, if it is not Pareto optimal, but is also not $\epsilon$-dominated by any point in S. The set of all near non-dominated points in S is designated Nd$\epsilon$-Points.

As mentioned, to support both sampling procedures, a Pareto filtering algorithm in accordance with the present invention is used that takes a sequence of disjoint candidate sets, $C_1, C_2, \ldots$ and produces the non-dominated sets corresponding to the union of these sequences. Thus, corresponding to the sets $S_1=C_1, S_2=S_1 \cup C_2, \ldots, S(j+1)=S_j \cup C_j, \ldots$, the Pareto filtering algorithm produces sets, NdPoints1, NdPoints2, $\ldots$, NdPointsj, $\ldots$, for each $S_1, S_2, \ldots, S_j, \ldots$.

FIG. 1 shows a pseudo-code implementation of an exemplary Pareto filter algorithm in accordance with the present invention. The algorithm of FIG. 1 starts with a set C of possible candidates and a set OldNdPoints of previously obtained non-dominated points. Initially, the set OldNdPoints is empty. The algorithm of FIG. 1 generates a new set of non-dominated points NewNdPoints.

In step 1 of the pseudo-code, the set NewNdPoints is set to the result by pushing a unique symbol (e.g., ":head") onto the front of a copy of OldNdPoints. This is done to facilitate list management of this set in the remaining steps of the algorithm.

In step 2, each candidate c in the set C is processed to determine if it is a non-dominated point. The function "First" used in various steps of Loop2 selects the first item from its argument, which must be a list of items. The function "Rest" selects all of the items in the list other than the first.

At step 3, the algorithm has completed and the set NewNd-Points is returned as the new set of non-dominated points.

For the first sampling procedure, the ParetoFilter algorithm is run with C=S, the entire population of points, and with OldNdPoints=φ, the empty set, in order to determine the set of non-dominated points corresponding to S. That is, NdPoints=ParetoFilter(S, φ).

For the second sampling procedure, an exemplary embodiment of the present invention uses a simulated annealing/evolutionary search algorithm (described below) to generate a sequence of sets C1, C2, and so on. The set of non-dominated points is efficiently maintained at each iterative stage.

The second sampling procedure generally comprises the following steps:

1. Generate an initial random sample of designs of size N (e.g. ~200). Call this the "Current Data Set."
2. Set IterationCounter to 1 and set Max_Iterations to 25, for example.
3. Perform the ParetoFilter algorithm on the Current Data Set. That is, determine which points in the Current Data Set are on the Pareto Frontier and which are in the interior.
4. If IterationCounter>=Max_Iterations, stop and report the Pareto subset of Current Data Set as the multi-objective optimization result. If not, go to the next step.
5. Based on the iteration number, select a fraction F from a simulated annealing schedule. The fraction F represents the proportion of samples to be generated near the Pareto Surface versus (1−F), the proportion to be generated near interior points. Let m1=Round(N*F) and m2=N−m1.
6. Randomly select m1 samples from the Pareto optimal subset of the Current Data Set and randomly perturb them to form m1 new sample designs. Randomly select m2 samples from the interior of the Current Data Set and randomly perturb them. Evaluate the N=m1+m2 new designs and add them to the Current Data Set.
7. Increment the IterationCounter and go to Step 3.

Implementation of the second sampling procedure entails the following: 1) a cooling schedule for the fraction F as a function of iteration number; 2) a method for generating an initial random sample of designs; and 3) a method for randomly perturbing a given design to a neighboring design.

As mentioned above, the cooling schedule comprises a list of proportions of Pareto samples (F) and non-Pareto samples (1−F) as a function of the iteration number. For example, in an exemplary embodiment of the present invention, the fraction F is generated using the following expression:

$$F=1-\text{Exp}(-1/(\text{InitialCoolingTempPref}*\text{TempReductionPref}^{(k+1)})),$$

where k is the iteration number, and the default values of InitialCoolingTempPref and TempReductionPref are approximately 11.166 and 0.85, in an exemplary embodiment of the present invention. This yields an initial fraction of 10% to be sampled from the current data set's Pareto-optimal subset, 90% from the Pareto-optimal subset on the 20th iteration, and 99.5% on the 25th iteration.

FIG. 2 shows an exemplary pseudo-code implementation of the second sampling procedure used in an exemplary embodiment of the present invention for successively sampling the trade space by biasing the samples towards the Pareto frontier. The set S is the set of all designs under consideration, NdPoints is the set of non-dominated points associated with this set, and NdePoints is the set of near non-dominated points. Niter is the number of iterations (e.g., 20) that the algorithm is repeated and is preferably user-specified.

The above implementation of the second sampling procedure relies on an initial sampling strategy and a neighbor sampling strategy. An exemplary embodiment of the present invention uses user-specified sample generators and neighboring sample generators for this purpose. A set of convenient default neighboring sample generators are defined for each sample generator. An exemplary embodiment of the present invention supports multiple sample generators and their associated default neighboring sample generators, described below. In the following, the term "x" refers to an arbitrary independent variable in the trade space, and "Old(x)" refers to the value this variable takes on in a previous sample and for which a "neighboring" value is to be computed.

A first sample generator is referred to as "Uniform" and can be implemented as follows in an exemplary embodiment of the present invention:

$x=$Uniform(<lower bound expression>,<upper bound expression>)

For each case, Uniform generates a real number uniformly distributed between the lower and upper bounds, which may be algebraic expressions or variables whose values may depend on the values of other variables as determined by the CMS.

The default neighbor for $x=$Uniform(A, B) is:

Neighbor($x$)=Uniform($A$_neighbor,$B$_neighbor), where:
d=Walk_Fraction_Preference*(New_B−New_A),
A_neighbor=Max(New_A, Min(Old(x)−d, New_B−d)),
and
B_neighbor=Min(New_B, Max(Old(x)+d, New_A+d)).

New_A and New_B are possibly updated values of A and B due to upstream changes in variables in the CMS. The term "Walk_Fraction_Preference" is a user controllable parameter with a default value of 0.1 in an exemplary embodiment of the present invention.

A second sample generator is called "UniformInteger" and can be implemented as follows in an exemplary embodiment of the present invention: x=UniformInteger(<lower bound exp.>, <upper bound exp.>)

For each case, UniformInteger generates an integer uniformly distributed between the lower and upper bounds, which may be algebraic expressions or variables whose values may depend on the values of other variables as determined by the CMS.

The default neighbor for $x=$UniformInteger(A, B) is:

Neighbor($x$)=UniformInteger($A$_neighbor,$B$_neighbor), where:
d=Max(1, Round(Walk_Fraction_Preference*(New_B−New_A))),
A_neighbor=Max(New_A, Min(Old(x)−d, New_B−d)),
and
B_neighbor=Min(New_B, Max(Old(x)+d, New_A+d)).

New_A and New_B are possibly updated values of A and B due to upstream changes in variables in the CMS.

A third sample generator is called "Normal" and can be implemented as follows in an exemplary embodiment of the present invention:
x=Normal(<mean>, <std. dev.>, <lower bound>, <upper bound>)

For each case, Normal generates a real number from a Gaussian distribution with the specified mean and standard deviation. Optionally, a lower and upper bound may be specified to restrict the range of the resulting values. For example, x=Normal(10, 3, 1, +∞) will generate samples from a Gaussian distribution with mean 10 and standard deviation 3 that are greater than 1. As with the other operators, each of the arguments can be algebraic expressions or variables whose values depend on the values of other variables as determined by the CMS.

An exemplary embodiment of the present invention uses the Uniform distribution for the neighboring sampling distribution for the Normal distribution. Thus, if the initial sampling distribution is defined as x=Normal(mean, sigma, lower, upper), then the default sampling distribution for neighbors of a point x is:

Neighbor(x)=Uniform(A_neighbor,B_neighbor), where:
  A_neighbor=Max(L, Min(Old(x)−delta, U−delta)),
  B_neighbor=Min(U, Max(Old(x)+delta, L+delta)),
with:
  d_sigma=Walk_Sigma_Preference*New_sigma,
  L=New_lower, if provided, else New_mean−d_sigma,
  U=New_upper, if provided, else New_mean+d_sigma, and
  delta=Walk_fraction_Preference*(U−L).

New_mean, New_sigma, New_lower, and New_upper are the values of mean, sigma, lower, and upper respectively, based on possible CMS updates. The term "Walk_Sigma_Preference" is a user controllable parameter which defaults to 3.0 in an exemplary embodiment.

A fourth sample generator is called "LogNormal" and can be implemented as follows in an exemplary embodiment of the present invention:

x=LogNormal(<mean>,<std. dev.>,<lower bound>,
    <upper bound>)

For each case, LogNormal generates a real number from a log-normal distribution with the specified mean and standard deviation. Optionally, a lower and upper bound may be specified to restrict the range of the resulting values. As with the other operators, each of the arguments can be algebraic expressions or variables whose values depend on the values of other variables, as determined by the CMS. The default neighbor for LogNormal is the same as that for Normal, described above.

A fifth sample generator, "Discrete," can be implemented as follows in an exemplary embodiment of the present invention:

x=Discrete(<Set expression>,<{p1, . . . , pn}>)

For each case, Discrete generates a random sample from the set specified by "Set expression." By default, each sample has an equal probability of being chosen. Optionally, a probability vector, {p1, . . . , pn}, can be specified, where the ith item is chosen with probability pi.

If the initial sampling distribution is defined as x=Discrete(S, {p1, . . . , pn}), then the default sampling distribution for neighbors of a point x is:

Neighbor(x)=DiscreteAbout(Old(x),Nochange_Probability_Preference,S, {p1, . . . , pn})

The DiscreteAbout function will return Old(x) with probability Nochange_Probability_Preference, which defaults to 0.8 in an exemplary embodiment of the present invention, or one of the remaining items in the set S with probability proportional to the vector (p1, . . . , pn). The probability vector is optional and defaults to the uniform distribution if it is omitted.

A sixth sample generator, "FactorialDesign," can be implemented as follows in an exemplary embodiment of the present invention:

{x_1, . . . , x_m}=FactorialDesign(<ExpressionSet or
    IndexSet_1>, . . . , <ExpressionSet or IndexSet_
    m>)

For each case, FactorialDesign generates a random sample without replacement for x_1, . . . , x_m from the factorial design for set_1 crossed with set_2 crossed with . . . set_m. Once the factorial design is exhausted, the sampling without replacement is repeated with possibly a different random order. This operator assures all permutations are sampled if the size of the factorial design subset is less than the total set of samples generated.

The default sampling distribution for neighbors of a point x_j generated within a FactorialDesign sample is:

Neighbor(x_j)=DiscreteAbout(Old(x_j),
    Nochange_Probability_Preference,S_j)

A seventh sample generator is called "AllDifferent" and is implemented as follows in an exemplary embodiment of the present invention: {x_1, . . . , x_m}=AllDifferent(m, <ExpressionSet or IndexSet>)

For each case, AllDifferent generates a random sample of size m, without replacement, for x_1, . . . , x_m from the specified set. The cardinality of the set must be greater than or equal to m. For example, {x_1, x_2, x_3}=AllDifferent(3, Range(1,10)) will generate different random integers from 1 to 10 for x_1, x_2, and x_3 for each sample. One such set of samples might be as listed in Table I.

TABLE I

|          | x_1 | x_2 | x_3 |
| --- | --- | --- | --- |
| Sample 1 | 3   | 1   | 8   |
| Sample 2 | 5   | 7   | 2   |
| Sample 3 | 9   | 1   | 5   |
| Sample 4 | 10  | 2   | 1   |
| Sample 5 | 3   | 4   | 6   |

The AllDifferent sample generator is particularly useful when there are a set of N resources or choices to be assigned or distributed among a set of M<N items. For example, consider the trade space defined by assigning items from the set Resource={F_16, F_15, A45, UAV_1, UAV_2, . . . , Resource_Type_100} to elements of the set Units={Air_Unit_1, Air_Unit_2, Air_Unit_3, Air_Unit_4}, with a model that can assess a set of performance metrics, costs, and support requirements for each configuration (or assignment of resources to units). The total number of possibilities is 100*99*98*97=94,109,400. The AllDifferent generator, with {Air_Unit_1, Air_Unit_2, Air_Unit_3, Air_Unit_4}=AllDifferent(4, Resource), will generate, for example, 100,000 randomly selected, alternative air unit configurations from the 94 million possible configurations.

The default neighbor sampling distribution for AllDifferent is the same as for FactorialDesign, described above. Thus, if the initial sampling distribution is defined as {x1, . . . , xn}=AllDifferent(n, S), then the default sampling distribution for neighbors of a point x_j is:

Neighbor(x_j)=DiscreteAbout(Old(x_j),
    Nochange_Probability_Preference,Sj), where S1=S, and Sj=Difference(S, {x1, . . . , xj−1}) for j= 2, . . . , n, where Difference(X, Y) is the set difference between X and Y.

An eighth sample generator, "Subset," is implemented as follows in an exemplary embodiment of the present invention:

$$\{x1, \ldots, xm\} = \text{Subset}(m, \text{fill}, S, \{p1, \ldots, pK\})$$

The Subset operator produces a random subset of size m from a set S having K elements. The elements of S are chosen according to the probability vector $\{p1, \ldots, pK\}$. The argument m may vary at run time and from sample to sample. The random subset of length m that is generated is stored in $\{x1, \ldots, xm\}$.

The neighboring distribution for the Subset operator is:

$$\{x1, \ldots, xm\} = \text{SubsetAbout}(m, \text{fill}, n\text{Change}, \text{oldSubset}, S, [,\{p1, \ldots, pK\}])$$

This operator generates a subset of size m that is a neighbor of the subset specified by the argument oldSubset. In particular, if:

1. m=Length(oldSubset): switch Max(1, nchange) items from oldSubset for new ones sampled from S;
2. m<Length(oldSubset): delete (Length(oldSubset)-m) items and switch nChange items; or
3. m>length(oldSubset): add (m-Length(oldSubset)) items and switch nChange items.

Each of the above operations respects the probability vector $\{p1, \ldots, pK\}$ as follows: (a) if items are to be added to a set, S1, from a set S, they are sampled without replacement from S-S1 with probability vector $\{p1, \ldots, pK\}$, renormalized over only the items in S-S1; (b) if items are to be deleted from a set, S1, they are removed (sampling without replacement) from S1 with probability vector computed from the reciprocal probabilities of the corresponding elements in S, renormalized over only the items in S1; and (c) if nChange items are to be switched in a set S1, first nChange items are removed from S1 according to the above, and then nChange items are added back in from S, again according to the above, while ensuring that the items removed are not added in again.

For the first sampling procedure, in an exemplary embodiment of the present invention, the ParetoFilter operator may be used in an equality constraint:

$$\text{ParetoFilter}(\exp, \text{obj1}[,\text{obj2}, \ldots ]),$$

where:
exp=an algebraic expression that evaluates to a compound value of type sequence-of-hash tables,
obji=Minimize|Maximize (vari [, toli]),
vari=<variable/key in the map>, and
toli=<expression that evaluates to tolerance for near optimality>.

For example, assuming Tr is a compound-valued variable representing a sequence of cases relating multiple variables in a trade space, three of which are the Range, Reliability, and Cost of an aircraft undergoing conceptual design, then: Pf=ParetoFilter(Tr, Maximize(Range), Minimize(Cost), Maximize(Reliability)) would set the value of the compound-valued variable Pf to the three-dimensional tradeoff envelope of the design space.

Because Pf is a variable in the CMS, its value may depend on the choice of many other variables. Those other variables can be varied to see the impact on the Pareto frontier. More specifically, the CMS can back solve for the values of one or more "upstream" variables so that user-selected attributes of the Pareto frontier achieve user-specified values. The "knee," specific jump points, the global minimum, and the global maximum are some examples of the scalar properties of the Pareto frontier that can be specified to satisfy user input values.

FIG. 3 illustrates the variation of a Pareto frontier for two different modeling assumptions for an exemplary UAV analysis. FIG. 3 shows the cost/performance trade-off envelopes of different sensor suites on board a UAV, based on an artificial model under two different costing assumptions. These trade spaces and associated Pareto envelopes were computed automatically by the CMS. Each associated Pareto envelope is a node in the CMS whose compound value depends upon the value of the upstream cost assumption parameter node. When the value of the cost-parameter variable changes, alternative trade-off envelopes are automatically computed.

Figure 4A:
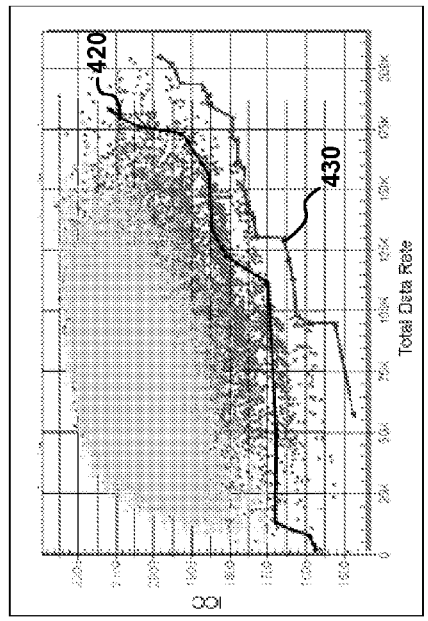
FIGS. 4A-4C show charts illustrating the trade spaces and Pareto frontiers resulting from the employment of two different exemplary sampling procedures in accordance with the present invention.
Figure 4B:
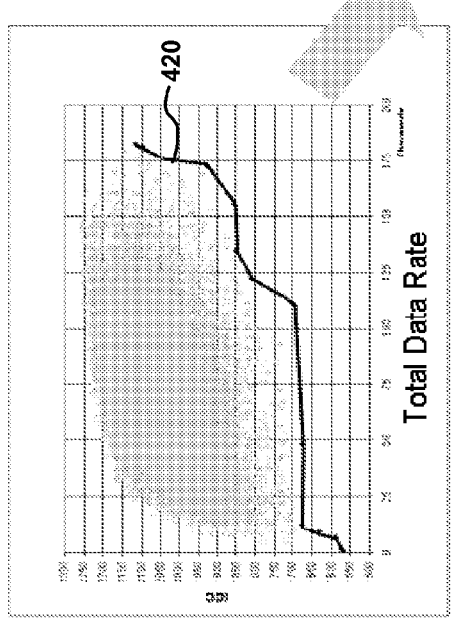
Figure 4C:
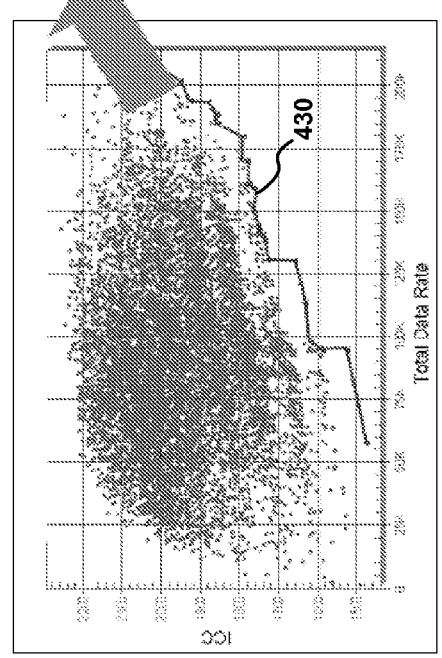

FIGS. 4A-4C illustrate a set of trades based on a real-world example comparing various metrics during the conceptual design of alternative communication systems. The charts demonstrate the differences between the first and second sampling procedures. The CMS network for this problem contains approximately 1000 variables. The individual designs were generated by varying eighteen separate waveband design choices, which constituted a subset of eighteen variables among the approximately 200 independent parameters in the problem. The Pareto frontier corresponds to designs that simultaneously maximize throughput and minimize cost.

As shown in FIGS. 4A-4C, Initial Capability Cost (ICC) is plotted against total data rate of a communication system among separate platforms. The graph of FIG. 4A was created by the CMS using the basic random sampling methodology of the first sampling procedure and is designed to "fill" a trade space. The line 420 is an estimate of the Pareto optimal surface for this space (minimizing cost and maximizing throughput) and is based on 100,000 randomly generated points.

The graph of FIG. 4B is a plot of the same parameters, but in this case the data set was generated using the simulated annealing/evolutionary search algorithm of the second sampling procedure and required substantially fewer samples. The line 430 represents an estimate of the Pareto optimal surface. In this case, 10,000 points were used as compared to 100,000 used for the chart of FIG. 4A. The simulated annealing/evolutionary algorithm-based Pareto surface is substantially improved over the purely random-sampling based estimate of this surface. Not only is it an improved optimized surface, but it was created with approximately one-tenth the effort. The graph of FIG. 4C superimposes the two sample populations in order to more clearly illustrate the improvement.

The above-described embodiments of the present invention can be implemented with any CMS that supports compound-valued variables. In accordance with a further aspect of the present invention, embedding compound-valued variables in a CMS will be described below with reference to FIG. 5.

Figure 5:
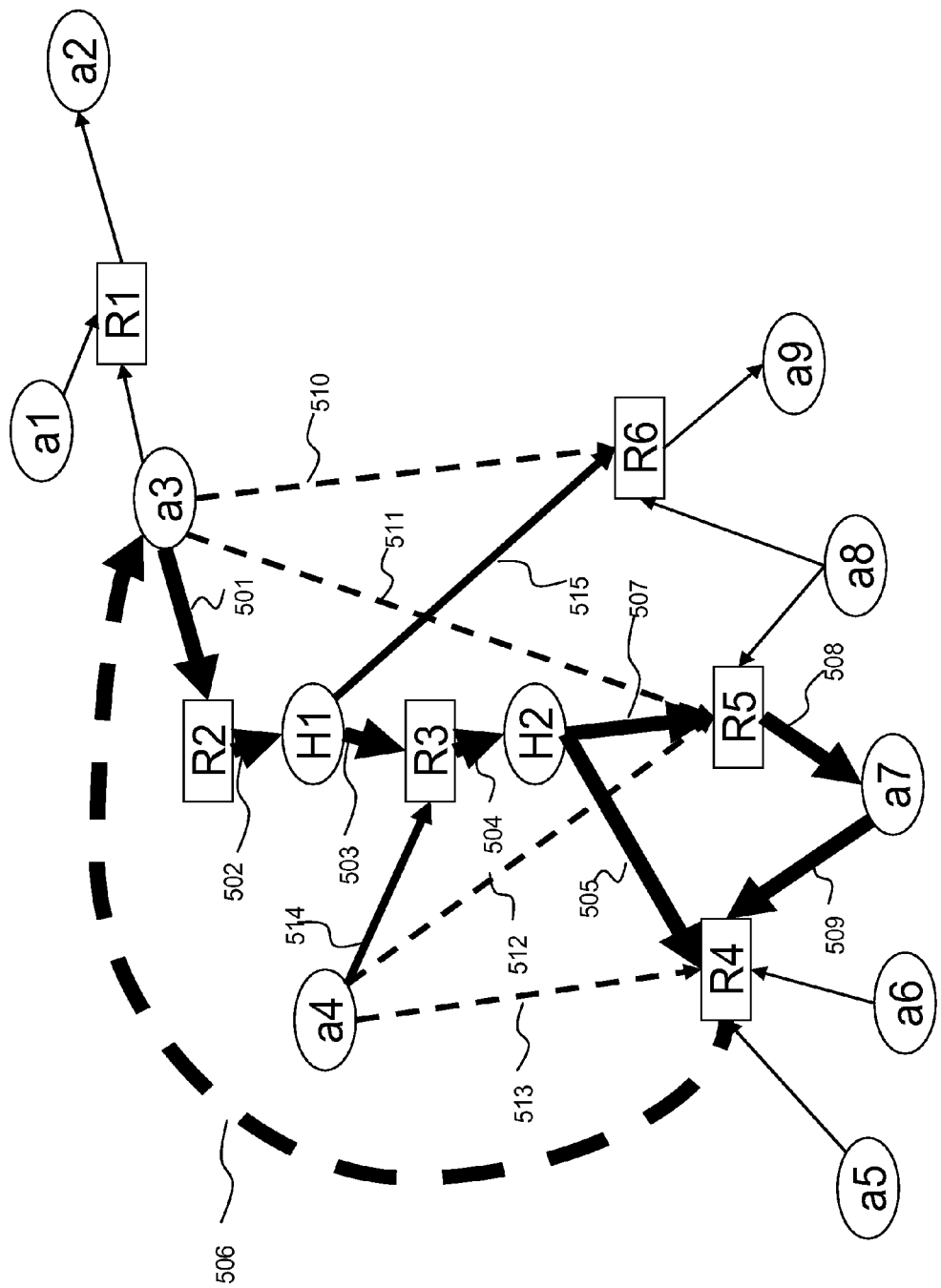
FIG. 5 schematically illustrates an exemplary problem with compound-valued variables processed by a CMS in accordance with the present invention.

FIG. 5 schematically illustrates an exemplary problem with compound-valued variables processed by a CMS in accordance with the present invention. In the example of FIG. 5, H1 and H2 are compound-valued variables and a1-a9 are scalar-valued variables. Variable a6 is made independent and variable a2 is dependent. The arcs 501-509 form an iterative cycle that is to be solved given values for scalar-valued variables a5, a6 and a8. Variables a3 and a1 can be used to define variable a2. H1 and a8 are used to define a9.

Certain arc "forcing" rules may be used to assure that a consistent iterative set of equations is developed. One such rule is that each compound-valued relation is associated with a single compound-valued variable and may be used to define only that variable. In FIG. 5, Relation R2 is forced to define H1, and R3 is forced to define H2. Thus, arcs 502 and 504 are forced in the indicated directions. Simple heuristics further imply that arcs 501, 503, 505, 507, 514 and 515 are forced in the directions shown. The CMS is not allowed to change the direction of such forced arcs.

The dashed lines 506, 510, 511, 512 and 513 are automatically added in order to allow automatic construction of iterative solutions for upstream variables if a downstream variable is made independent. The dashed lines 506 and 510-513 are drawn from each scalar variable influencing a compound-valued variable to each scalar relation influenced by the compound-valued variable. Each member of the first of these sets, referred to as a Scalar Influencing Variable for a compound variable V, may be defined recursively as:

1. Any scalar variable in the relation defining the compound variable, V.
2. Any scalar influencing variable for any other compound variable in the relation defining the compound variable V.

The second of the above sets, a compound-valued variable V's Immediate Influenced Scalar Relations is the set of all relations the compound variable V is in and that define a scalar variable.

In FIG. 5, a3 is the only scalar influencing variable for H1. a3 and a4 are the scalar influencing variables for H2. R6 is the only immediate influenced scalar relation for H1 and therefore line 510 is added between a3 and R6. Both R4 and R5 are immediate influenced scalar relations for H2. Therefore, lines 511 and 512 are added from a3 and a4, respectively, to R5, and lines 506 and 513 are added from a3 and a4, respectively, to R4.

FIG. 5 shows the arc direction if the variable a6 is made independent and a2 is made dependent. The purpose of the dashed arcs is to be able to identify the upstream scalar variables that can be incorporated into iterative cycles to solve the system. The iterative solution procedure uses one or more scalar valued variables for iteration and a similar number of scalar relations for error terms. In this case, the iterative algorithm will choose a3 as the iteration variable and R4 as the error relation. Given a guess at a3, the solution algorithm will use R2 to define H1, R3 (together with a known value for a4 as it is an independent variable) to define H2, R5 together with the calculated value of H2 to define a7, and then evaluate the scalar error implied in R4 by the values of H2, a5, a6, and a7. It will iterate on the value of a3 until this error is within a tolerance of zero.

The method of the present invention can be implemented in software executed by a general purpose computer.

It is understood that the above-described embodiments are illustrative of only a few of the possible specific embodiments that can represent applications of the invention. Numerous and varied other arrangements can be made by those skilled in the art without departing from the spirit and scope of the invention.

What is claimed is:

1. In a constraint management system (CMS), a computer-implemented method of determining Pareto-optimal designs of a subject system, the method comprising, by a computer:
representing a trade space in the CMS as a network of nodes including a plurality of variables, one or more auxiliary input parameters, and equality constraints defining relationships between the variables, wherein at least one variable is a user-selected independent variable and at least one variable is a user-selected dependent variable;
determining a computational plan using the equality constraints for computing the at least one user-selected dependent variable from the at least one user-selected independent variable and the one or more auxiliary input parameters;
performing an iterative multiple-objective optimization sampling procedure on the trade space to determine the Pareto-optimal designs, including:
generating a set of designs, wherein each of the set of designs is associated with a value assigned to the at least one user-selected independent variable and a corresponding value computed for the at least one user-selected dependent variable using the computational plan,
selecting a subset of the set of designs in accordance with an annealing schedule,
perturbing the subset of designs to neighboring designs,
evaluating the set of designs and neighboring designs using the computational plan, each design and neighboring design being associated with a value of the at least one user-selected independent variable and a corresponding value of the at least one user-selected dependent variable,
determining a subset of the set of designs and neighboring designs that are Pareto-optimal;
embedding in the network of nodes a constraint and a compound-valued variable representing the Pareto-optimal designs, wherein the constraint provides the Pareto-optimal designs for given values of the one or more auxiliary input parameters;
automatically re-determining the Pareto-optimal designs using the constraint and compound-valued variable embedded in the network of nodes as values of the one or more auxiliary input parameters are varied; and
reporting the set of Pareto-optimal designs.

2. The method of claim 1, comprising:
using the constraint and compound-valued variable embedded in the network of nodes to automatically back-solve for values of one or more user-selected auxiliary input parameters so that one or more user-selected scalar attributes of the Pareto-optimal designs achieve user-specified values.

3. The method of claim 2, comprising using the CMS to determine the feasibility of back-solving for one or more user-selected auxiliary input parameters before performing the back-solving operation for any such parameter.

4. The method of claim 1, wherein embedding the compound-valued variable in the constraint management system includes:
associating upstream scalar variables to downstream scalar relations;
determining one or more scalar upstream variables to be made dependent when one or more scalar variables downstream of the embedded compound valued variable are made independent; and determining at least one iterative computational procedure to be solved for calculating the value of the one or more scalar upstream variables for specified values of the one or more scalar variables downstream of the embedded compound valued variable.

5. The method of claim 4, wherein the upstream scalar variables influence compound-valued variables which influence the downstream scalar relations.

6. The method of claim 1, wherein generating the set of designs includes using a sample generator including at least one of a deterministic and a random operation.

7. The method of claim 6, wherein the sample generator is user-specified.

8. The method of claim 1, wherein perturbing the subset of designs to neighboring designs includes using a neighboring sample generator including at least one of a deterministic and a random operation.

* * * * *